(12) United States Patent
Xiang et al.

(10) Patent No.: US 10,942,782 B2
(45) Date of Patent: *Mar. 9, 2021

(54) WORKLOAD ESTIMATION OF DATA RESYNCHRONIZATION

(71) Applicant: VMware, Inc., Palo Alto, CA (US)

(72) Inventors: Enning Xiang, San Jose, CA (US);
Eric Knauft, San Francisco, CA (US);
Vishal Kher, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,244

(22) Filed: Sep. 26, 2019

(65) Prior Publication Data

US 2020/0019440 A1 Jan. 16, 2020

Related U.S. Application Data

(63) Continuation of application No. 15/955,900, filed on Apr. 18, 2018, now Pat. No. 10,445,144.

(51) Int. Cl.
*G06F 9/46* (2006.01)
*G06F 9/50* (2006.01)
*G06F 3/06* (2006.01)
*G06F 9/48* (2006.01)
*G06F 16/27* (2019.01)

(52) U.S. Cl.
CPC ............ *G06F 9/505* (2013.01); *G06F 3/0607* (2013.01); *G06F 3/0632* (2013.01); *G06F 3/0653* (2013.01); *G06F 3/0689* (2013.01); *G06F 9/4881* (2013.01); *G06F 16/27* (2019.01)

(58) Field of Classification Search
None
See application file for complete search history.

*Primary Examiner* — Gregory A Kessler
(74) *Attorney, Agent, or Firm* — Patterson + Sheridan, LLP

(57) ABSTRACT

Embodiments include estimating a workload of a re-synchronization task for a data component in a logical storage system. Embodiments include detecting a connection from the data component, wherein the data component was previously disconnected. Embodiments further include determining a layout of the logical storage system. Embodiments further include estimating the workload of the re-synchronization task based on the layout. One or more actions may be performed based on the estimate.

20 Claims, 6 Drawing Sheets

WORKLOAD ESTIMATION OF DATA RESYNCHRONIZATION

RELATED APPLICATIONS

The present patent is a continuation of, and hereby claims priority under 35 U.S.C § 120 to pending U.S. patent application Ser. No. 15/955,900, entitled "WORKLOAD ESTIMATION OF DATA RESYNCHRONIZATION," by the same inventors, filed on 18 Apr. 2018.

BACKGROUND

Logical storage systems (e.g., including logical components backed by physical storage devices) often employ one or more types of data replication in order to protect against data loss in the event of a system failure (e.g., hardware crash, file corruption, or the like). For example, the logical components of a logical storage system may be organized in various types of redundant array of independent disks (RAID) configurations. When a logical component goes offline (e.g., fails) and then reconnects, it may be resynchronized using other logical components in the system.

In distributed logical storage systems, such as those shared by a plurality of users, it may be useful to estimate a workload (e.g., amount of resources) required to resynchronize a logical component. For example, such estimates may allow for appropriate allocation of bandwidth for resynchronization tasks or may allow a user to determine a best time to initiate a resynchronization task. In basic cases, this estimate may be roughly based on the total allocated size of the logical component to be resynchronized. This technique may not result in an accurate estimate in many cases, however, such as in systems involving thin-provisioned data. Thin-provisioning involves allocating disk storage space in a flexible manner among multiple users, based on the minimum space required by each user at any given time, rather than allocating all storage space in advance. Because an allocated size of a logical component may be quite different from a physically used size of the logical component on a physical storage device in such systems, estimating a workload required to resynchronize a logical component may be difficult. Furthermore, when a logical storage system involves a complex configuration including different types of redundancy, it may be particularly challenging to estimate a workload required to resynchronize a logical component. As such, there is a need for improved methods for estimating a workload required to resynchronize a logical component in a logical storage system.

DETAILED DESCRIPTION

Figure 1:
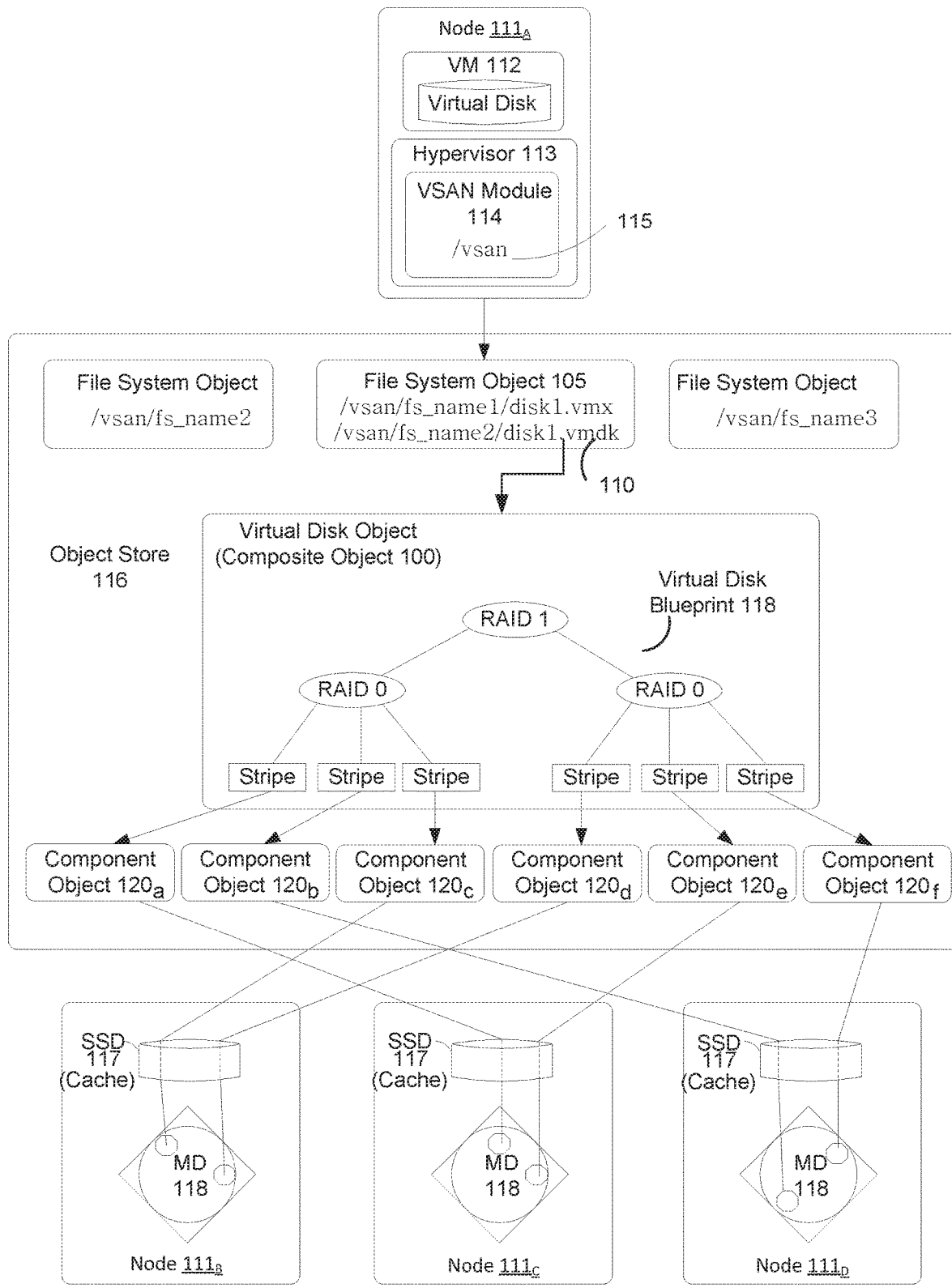
FIG. 1 depicts an example hierarchical structure of storage objects that represent a logical storage system for which embodiments of the present disclosure may be implemented.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Embodiments of the present disclosure relate to estimating a workload (e.g., amount of resources, such as CPU cycles, network bandwidth, etc.) required to re-synchronize a logical component in a logical storage system such as a virtual storage area network (V SAN). Such an estimate may be useful, for example, in optimizing and allocating resources in the logical storage system. For instance, the estimate may be used (e.g., automatically or by a user), to limit a number of re-synchronization tasks that can be performed at the same time so that sufficient resources are available for other tasks (e.g., I/O traffic sent from users), choose an optimal time for performing a re-synchronization task, allocate an adequate amount of resources to re-synchronization tasks, limit resource usage of tasks other the re-synchronization task, choose alternatives to the re-synchronization task (e.g., restoring the logical component from a backup), and/or the like. Techniques described herein are particularly useful in logical storage systems involving thin-provisioning, where it may be otherwise difficult to estimate a workload required to perform a re-synchronization task (e.g., due to dynamic resource allocation).

In one embodiment, a logical storage system may include a plurality of logical components (e.g., data partitions backed by physical storage resources) that are organized according to one or more fault-tolerant or redundancy configurations. A logical component may temporarily become absent from the logical storage system (e.g., due to file corruption, a hardware crash, or the like) and may subsequently reconnect, at which time a re-synchronization task may need to be performed in order to synchronize the logical component with the current state of the system (e.g., by copying data from one or more logical components, such as mirror or stripe components, that contain a redundant copy of the data that is needed by the logical component to be re-synchronized). Prior to performing a re-synchronization task, techniques described herein allow for estimating a workload required to perform the re-synchronization task.

An estimate of the workload required to perform a re-synchronization task may be determined in different ways depending on a layout of the logical storage system. For example, if the logical component to be re-synchronized has an active mirror component (e.g., a node that contains a complete mirror image of the logical component and is currently available and up to date), the used capacity of the active mirror component may be used as the estimate (e.g., because the re-synchronization task may comprise copying the data from the active mirror component to the logical component). If an active mirror component is not available, but a stale mirror component is available (e.g., a node that contains an out-of-date copy of the data that should be present on the logical component), the estimate of the workload may be the used capacity of the stale mirror plus an estimation of the missed IO operations (e.g., data writes) at the stale mirror (e.g., based on log sequence numbers, as described in more detail below with respect to FIGS. 3 and 6). This may be an accurate estimate because the re-synchronization task may involve copying the data from the stale mirror component, as well as any data that was missed by the stale mirror component from a different node, to the component to be re-synchronized.

If neither an active mirror component nor a stale mirror component is available, the estimate of the workload may be the average used capacity of any qualified sibling nodes of the logical component to be re-synchronized. A sibling node may be considered to be "qualified" if it is active and has full (or near full) data availability (e.g., if the sibling node is up to date and accessible). If there are no qualified sibling nodes, the estimate may be the used capacity of a qualified parent node of the logical component divided by a number of child nodes of the qualified parent node. A parent node may similarly be "qualified" if it is active and has full (or near full) data availability. In the event that there are no active or stale mirror components, no qualified sibling nodes, and no qualified parent nodes, the workload to perform the re-synchronization task may be estimated to be the logical address space of the logical component to be re-synchronized.

It is noted that the term "node" may generally refer to a logical component (e.g., component object or data partition) within a logical storage system (e.g., a virtual disk), and is generally used when describing hierarchical relationships between logical components (e.g., sibling, parent, child, or the like).

Embodiments of the present disclosure constitute an improvement with respect to conventional industry practice, as they allow for the workload required to re-synchronize a logical component to be accurately estimated in advance of performing the re-synchronization task. Employing used capacities of other components which contain copies of data in various fault-tolerant configurations with respect to a logical component to be re-synchronized, in combination with hierarchical information and log sequence numbers, allows for accurate re-synchronization workload estimates to be determined with relatively little processing. Estimates determined according to techniques described herein allow for more intelligent scheduling (e.g., automatically or by users) and resource allocation with respect to re-synchronization tasks, in addition to allowing for more intelligent determinations as to whether to perform re-synchronization tasks or choose alternative methods of restoring logical components, thereby improving the functioning of computer systems by reducing congestion, preventing bottlenecks, avoiding system crashes, ensuring resource availability for other tasks, and the like.

FIG. 1 depicts an example hierarchical structure of storage objects that represent a logical storage system (e.g., a virtual disk). The example depicted in FIG. 1 is merely one example of a logical storage system with which embodiments of the present disclosure may be implemented, and techniques described herein are not limited to virtual storage systems. For example, embodiments of the present disclosure may alternatively be implemented with physical storage systems.

A virtual machine (VM) 112 running on one of nodes 111 may perform I/O operations on a virtual disk that is stored as a hierarchical or composite object 100 in object store 116. Hypervisor 113 provides VM 112 access to the virtual disk by interfacing with an abstraction of a virtual storage area network (VSAN) through VSAN module 114 (e.g., by auto-mounting the top-level file system object corresponding to the virtual disk object). For example, VSAN module 114, by querying its local copy of an in-memory metadata database, is able to identify a particular file system object 105 (e.g., a virtual machine file system (VMFS) object in one embodiment) stored in VSAN that stores a descriptor file 110 for the virtual disk (e.g., a .vmdk file, etc.). It should be recognized that the file system object 105 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 110 includes a reference to composite object 100 that is separately stored in object store 116 and conceptually represents the virtual disk (and thus may also be sometimes referenced herein as a logical disk object or virtual disk object). Composite object 100 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPS, etc.) generated by an administrator when creating the virtual disk.

RAID configurations can be specified by blueprint to improve data reliability and availability. More generally, a storage object can be built from a hierarchy or tree of RAID nodes sometime referred to as RAID primitives. RAID1 (mirroring), RAID0 (striping), RAID5/6 (erasure coding), and RAID CONCAT (simple RAID) are well known primitives that can be used in the tree. Each of these nodes results in a transformation of the address space of the storage object. For example, RAID1 copies the address among its children and RAID0 splits the address space up in a round-robin fashion among its children without providing any replication. RAID5/6 does a combination of both, resulting in smaller sized components and some internal redundancy. In RAID CONCAT, data is stored across disks in a linear fashion from one disk to the next.

For example, composite object 100 includes a virtual disk blueprint 115 that describes a RAID1 configuration where two mirrored copies of the virtual disk (e.g., mirrors) are each further striped in a RAID0 configuration. Composite object 125 may thus contain references to a number of "leaf" or "component" objects 120x (e.g., logical components) corresponding to each stripe (e.g., data partition of the virtual disk) in each of the virtual disk mirrors. The metadata accessible by VSAN module 114 in the in-memory metadata database for each component object 120 (e.g., for each stripe) provides a mapping to or otherwise identifies a particular node 111x in the physical storage resources (e.g., magnetic disks 118, etc.) that actually store the stripe (as well as the location of the stripe within such physical resource). The local storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

Embodiments of the present disclosure may be used with the logical storage system depicted in FIG. 1 to estimate a workload required to re-synchronize a logical component (e.g., component object 120x), as described below with respect to FIGS. 2-6.

Figure 2:
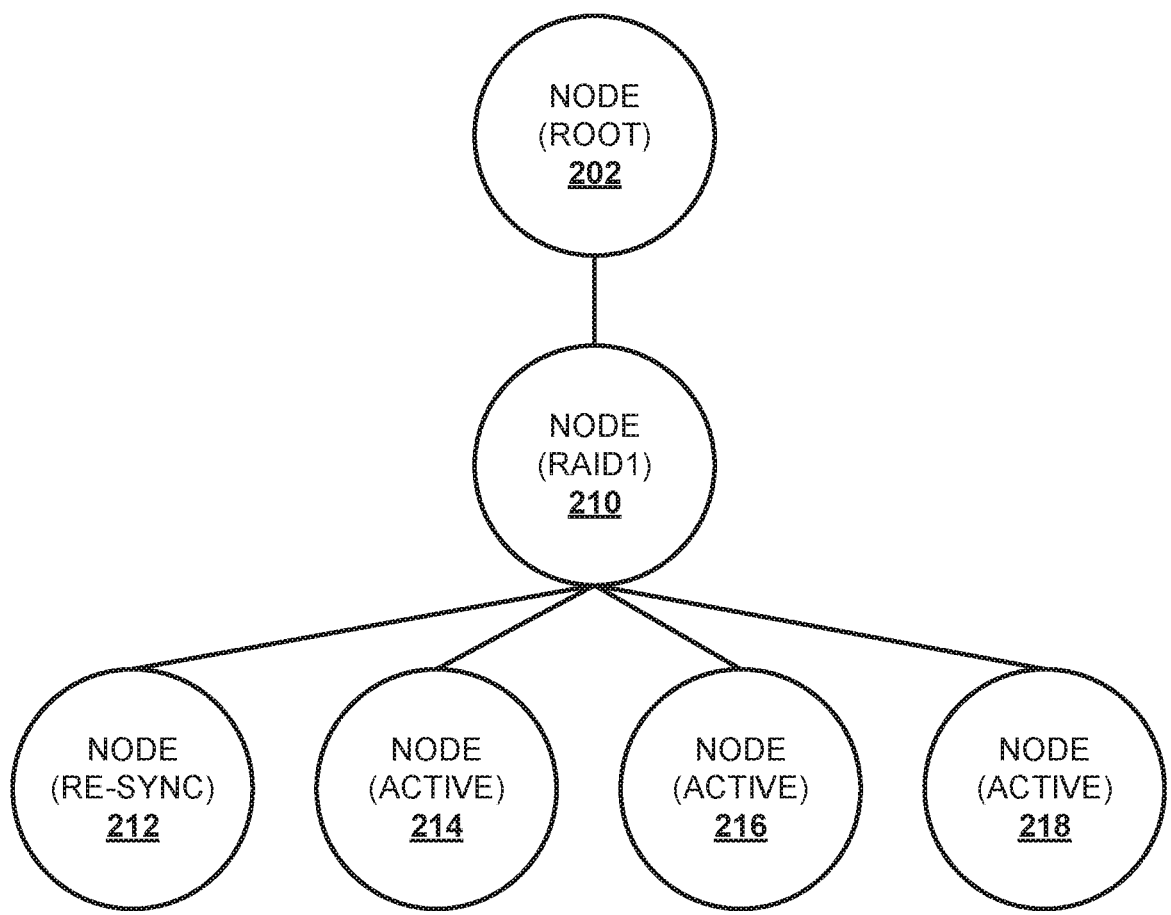
FIG. 2 depicts an example layout for nodes of a logical storage system in which a workload is estimated for re-synchronizing a node.

FIG. 2 depicts an example layout for nodes of a logical storage system (e.g., which may be defined in a logical disk object, as described above with respect to FIG. 1) in which a workload is estimated for re-synchronizing a node (e.g., a logical component) according to techniques described herein. Each node may, for example, comprise a logical component of the logical storage system.

As depicted, a root node 202 has a child node 210 that is organized in a RAID1 configuration, wherein the complete address space of node 210 (e.g., all of the data stored in node 210) is copied (e.g., mirrored) to each of its children. Nodes 212, 214, 216, and 218 are therefore mirror components of each other in addition to being mirror components of node 210. In the present example, node 212 is to be re-synchronized. For example, node 212 may have become absent for a time (e.g., node 212 may have disconnected or otherwise become inactive due to a hardware or software failure), and may have reconnected to the logical storage system. Before the re-synchronization task is performed, an administrative entity (e.g., VSAN module 114 of FIG. 1, an administrative server, or the like) may determine an estimate of the workload required to perform the re-synchronization task.

In the example depicted in FIG. 2, each of nodes 214, 216, and 218 is an active mirror component of node 212. Therefore, the workload for the re-synchronization task is estimated to be the used capacity (e.g., the amount of logical storage space that is currently occupied by data) of any of nodes 214, 216, and 218. For example, the used capacity of node 214 may be used as the estimate.

Figure 3:
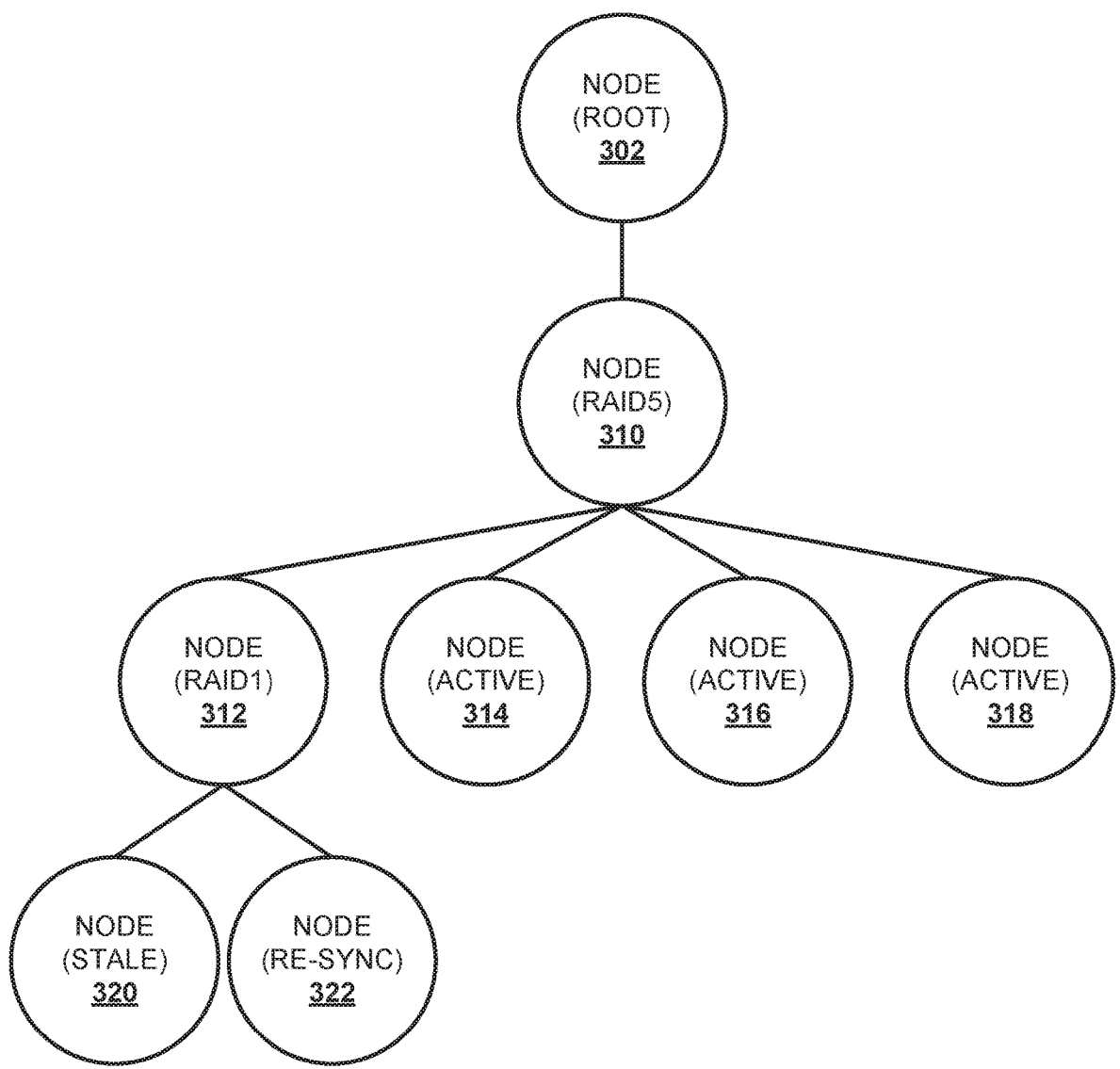
FIG. 3 depicts another example layout for nodes of a logical storage system in which a workload is estimated for re-synchronizing a node.

FIG. 3 depicts another example layout for nodes of a logical storage system in which a workload is estimated for re-synchronizing a node according to techniques described herein.

As depicted, a root node 302 has a child node 310 that is organized in a RAID5 configuration, wherein the address space of node 210 is distributed, along with parity information, among each of nodes 312, 314, 316, and 318 such that the data of node 310 can be reconstructed from any three of nodes 312, 314, 316, and 318. Node 312 is organized in a RAID1 configuration, wherein the address space of node 312 is copied to each of its children. Nodes 320 and 322 are therefore mirror components of each other in addition to being mirror components of node 312. In the present example, node 322 is to be re-synchronized.

An estimate of the workload required to re-synchronize node 322 is determined. In the example depicted in FIG. 3, node 320 is a stale mirror component of node 322. For example, node 320 may have become absent or inactive for a time, and may not have completed a re-synchronization operation yet (e.g., the re-synchronization operation may not have been initiated, or may be scheduled for a later time). Node 320 may therefore not contain the latest state of the data from node 312. Therefore, the workload for the re-synchronization task is estimated to be the used capacity of node 320 plus an estimation of missed IO operations (e.g., write operations) at node 320.

Determining missed IO operations may involve comparing a log sequence number (LSN) of the last IO operation at node 320 with a LSN of the last IO operation of the logical storage system (e.g., stored in a log by the logical disk object). For example, each IO operation may be written along with a LSN to a log at each component as well as to a log associated with the entire logical storage system. Comparing the LSN of the last IO operation at node 320 with the LSN of the last IO operation for the logical storage system may provide an estimation of how many IO operations have been missed at node 320 (e.g., during a time that node 320 was inactive). For example, if the LSN of the last IO operation at node 320 is 2000 and the LSN of the last IO operation of the logical storage system is 2500, it may be estimated that 500 IO operations have been missed at node 320. As such, resources required for 500 IO operations may be added to the used capacity of node 320 in order to determine the estimate of the workload for re-synchronizing node 322.

Figure 4:
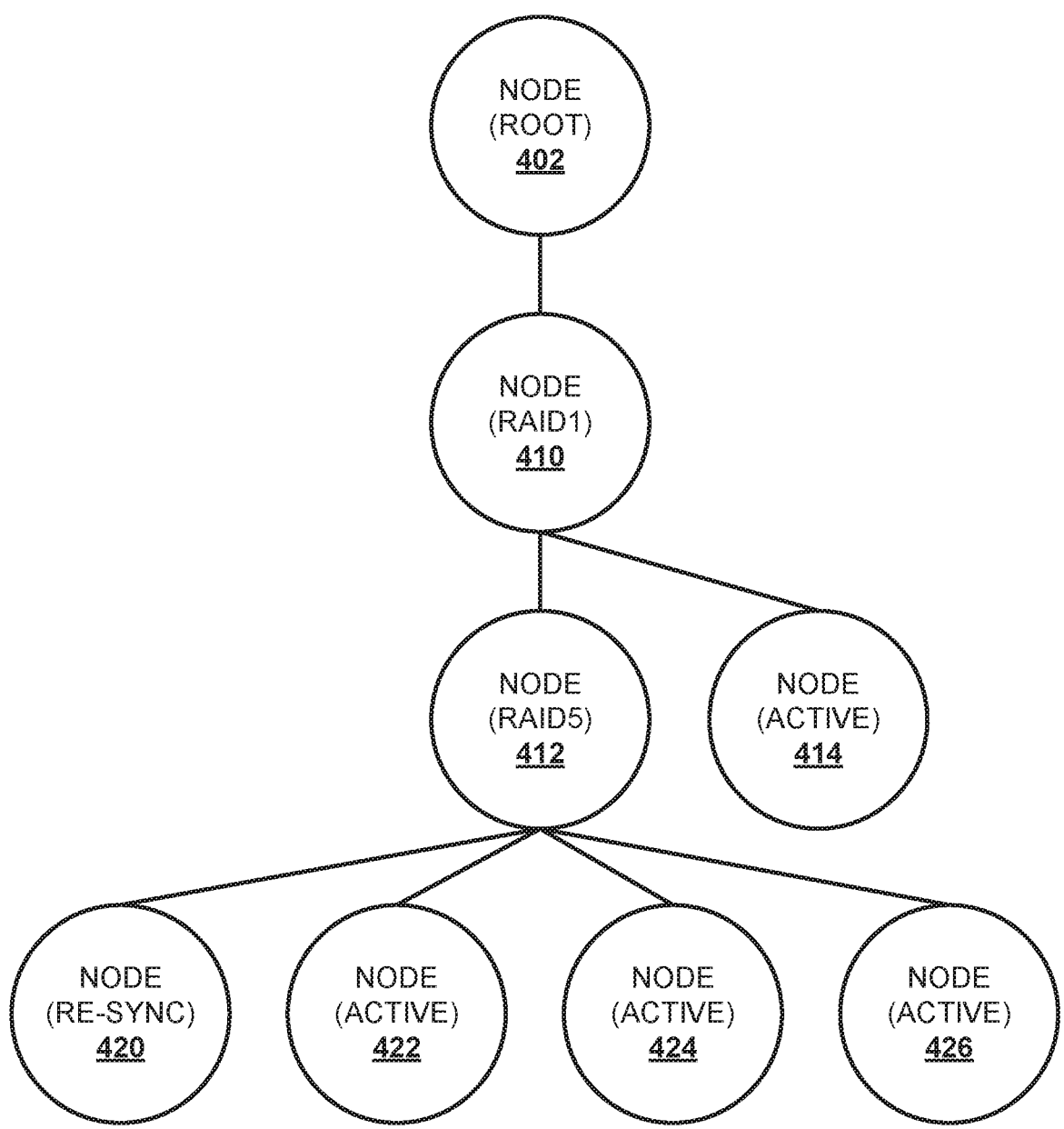
FIG. 4 depicts another particular layout for nodes of a logical storage system in which a workload is estimated for re-synchronizing a node.

FIG. 4 depicts another example layout for nodes of a logical storage system in which a workload is estimated for re-synchronizing a node according to techniques described herein.

As depicted, a root node 402 has a child node 410 that is organized in a RAID1 configuration, wherein the address space of node 410 is copied to each of its children. Nodes 412 and 414 are therefore mirror components of each other in addition to being mirror components of node 410. Node 412 is organized in a RAID5 configuration, wherein the address space of node 412 is distributed, along with parity information, among each of nodes 420, 422, 424, and 426 such that the data of node 412 can be reconstructed from any three of nodes 420, 422, 424, and 426. In the present example, node 420 is to be re-synchronized.

An estimate of the workload required to re-synchronize node 420 is determined. In the example depicted in FIG. 4, node 420 does not have an active or stale mirror component, as its sibling nodes are not mirror components. Because node 412 is organized according to a RAID5 configuration, the data of node 412 is distributed among each of nodes 420, 422, 424, and 426, rather than, for example, being mirrored. As node 420 does not have either an active or stale mirror component, it will be determined whether it has qualified sibling nodes. In the present example, each of nodes 422, 424, and 426 (e.g., the sibling nodes of node 420) is active and has full data availability, and is therefore qualified. Therefore, the workload for the re-synchronization task is estimated to be the average used capacity of nodes 422, 424, and 426. For example, the used capacity of each of nodes 422, 424, and 426 may be added together and divided by three (e.g., the number of nodes being averaged).

The used capacity of a sibling node may be determined in different ways depending on the layout of the logical storage system. In the example depicted in FIG. 4, each of the sibling nodes 422, 424, and 426 is a leaf node (e.g., has no child nodes), so the used capacity of each is easily determined by analyzing the amount of storage that is occupied on the node. In other logical storage system layouts (e.g., where one or more sibling nodes are not leaf nodes), however, there may be more steps required to determine the used capacity of a sibling node.

If a sibling node is not a leaf node and is organized according to a mirror configuration (e.g., RAID1), the used capacity of the sibling node is determined by identifying the used capacity of any available child node, as each child node of the sibling node will be a mirror component of the sibling node. If a sibling node is not a leaf node and is organized according to a stripe configuration (e.g., RAID0) or RAID CONCAT, the used capacity of the sibling node is determined by adding up the used capacity of all of the child nodes of the sibling node. Generally, all child nodes of the sibling node must be available in order for this technique to be employed when the sibling node is organized according to a RAID0 configuration.

If a sibling node is organized according to a mirror over stripe configuration (e.g., RAID1 over RAID0), and does not have an available child node, the used capacity of the sibling node is determined by adding up the used capacity of a combination of available grandchild nodes of the sibling node, wherein the combination of grandchild nodes is selected in order to cover the entire address space of the sibling node (e.g., each child of the sibling node is a mirror component of the sibling node and each of these mirror components is arranged according to a stripe configuration, so a subset of the grandchild nodes beneath one mirror component may be combined with a subset of the grandchild nodes beneath another mirror component in order to cover the entire used capacity of one of the mirror components, which is the same as the used capacity of the sibling node).

If a sibling node is organized according to an erasure coding configuration (e.g., RAID EC or RAID5/6), the used capacity of the sibling node is determined by calculating the average used capacity of all available child nodes and multiplying it by the number of data nodes (e.g., the number of nodes required to fully reconstruct the data) of the sibling node. Generally, erasure coding (EC) is a method of data protection in which data is broken into fragments, expanded and encoded with redundant data pieces and stored across a set of different locations or storage media, and generally requires a certain number of nodes to be available to reconstruct the data (e.g., these nodes may generally be referred to as data nodes).

It is noted that techniques described herein with respect to determining the used capacity of sibling nodes may also be employed in determining the used capacity of other types of nodes, such as parent nodes. For example, these techniques may be employed with the embodiment described below with respect to FIG. 5, wherein the used capacity of a parent node is determined.

Figure 5:
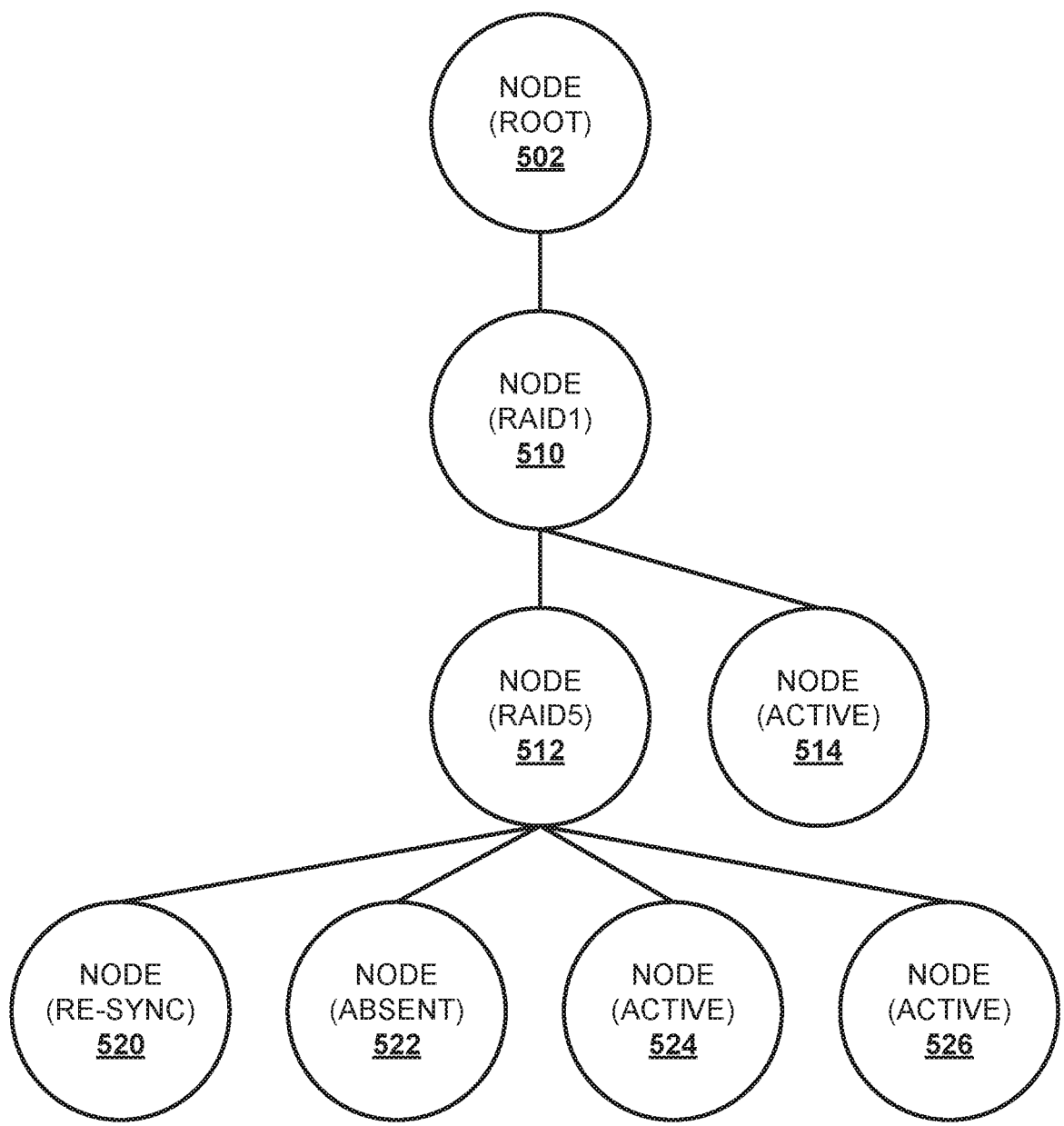
FIG. 5 depicts another example layout for nodes of a logical storage system in which a workload is estimated for re-synchronizing a node.

FIG. 5 depicts another example layout for nodes of a logical storage system in which a workload is estimated for re-synchronizing a node according to techniques described herein.

As depicted, a root node 502 has a child node 510 that is organized in a RAID1 configuration, wherein the address space of node 510 is copied to each of its children. Nodes 512 and 514 are therefore mirror components of each other in addition to being mirror components of node 510. Node 512 is organized in a RAID5 (e.g., RAID EC) configuration, wherein the address space of node 512 is distributed, along with parity information, among each of nodes 520, 522, 524, and 526 such that the data of node 512 can be reconstructed from any three of nodes 520, 522, 524, and 526. In the present example, node 520 is to be re-synchronized. Node 522 is absent (e.g., disconnected or otherwise unavailable due to a hardware or software failure), while nodes 524 and 526 are active.

An estimate of the workload required to re-synchronize node 520 is determined. In the example depicted in FIG. 5, node 520 does not have either an active or stale mirror component, as its sibling nodes are not mirror components. Furthermore, node 520 does not have three available sibling nodes (e.g., in RAID5, all nodes but one are required to reconstruct the data, which would mean that three available nodes would be required in this case) because node 522 is absent (and therefore is not qualified). As such, it is determined whether node 520 has a qualified parent node. In this case, node 514 is a qualified parent node, as it is a mirror of node 512 (the direct parent of node 520), and it is active with full data availability. As such, the workload to re-synchronize node 520 is estimated to be the used capacity of node 514 divided by a divisor. The divisor is 1 for RAID1 configurations, the divisor is the number of child nodes of the parent node for RAID0 configurations, and the divisor is the number of data nodes (e.g., the number of nodes needed to reconstruct the data) of the parent node for RAID5/6 configurations. Because the direct parent of node 520, node 512, is organized according to RAID5, the divisor in this case is three. Accordingly, the workload to re-synchronize node 520 is estimated to be the used capacity of node 514 divided by three.

It is noted that, while FIGS. 1-5 involve particular layouts of a logical storage system, embodiments of the present disclosure are not limited to the layouts depicted, and may be employed in a variety of different layouts. Furthermore, particular fault-tolerant configurations (e.g., RAID0, RAID1, RAID5, RAID CONCAT, and the like) are included as examples, and other configurations may be employed without departing from the scope of the present disclosure.

Estimates of workloads determined according to techniques described herein (e.g., with respect to FIGS. 1-5) may be used to improve scheduling of tasks in order to optimize usage and availability of system resources. In some embodiments, an estimated time to complete a re-synchronization task may be determined based on the estimated workload for the re-synchronization task. For example, the estimated workload may be divided by an estimated speed of a data copy flow in the system (e.g., determined based on current or historical data copy flow speeds) in order to determine an estimated time to complete the re-synchronization task. The estimated time may be provided to a user, and the user may schedule tasks, such as services with different quality of service (QOS) levels for customers, based on the estimated time. In certain embodiments, estimates of workloads may be used to automatically schedule re-synchronization tasks. For example, it may be beneficial to complete re-synchronization tasks with smaller workloads first in order to provide a higher level of data availability and reliability of a logical storage system more quickly. As such, estimates of workloads for re-synchronization tasks may be used to determine scheduling priorities for re-synchronization tasks (e.g., re-synchronization tasks with smaller workloads may be assigned higher priorities), and re-synchronization tasks with higher priorities may be scheduled earlier than those with lower priorities.

In certain embodiments, an estimated workload for a re-synchronization task may be used to determine whether to perform the re-synchronization task or to restore the logical component using a different method. For example, if the estimated workload (or, alternatively, an estimated time to complete the re-synchronization task that is determined based on the estimated workload) exceeds a threshold, it may be determined that the logical component should be restored using an alternative method, such as restoring from a backup. In other embodiments, if the estimated workload or the estimated time to complete the re-synchronization task exceeds a threshold, a reduction may be made to resources allocated to tasks other than the re-synchronization task in order to ensure that sufficient resources are available to complete the re-synchronization task. For example, if the re-synchronization task is the only or best available method of restoring the logical component, it may be important to control the resource usage of other tasks so that the re-synchronization task may be completed in a timely manner.

Figure 6:
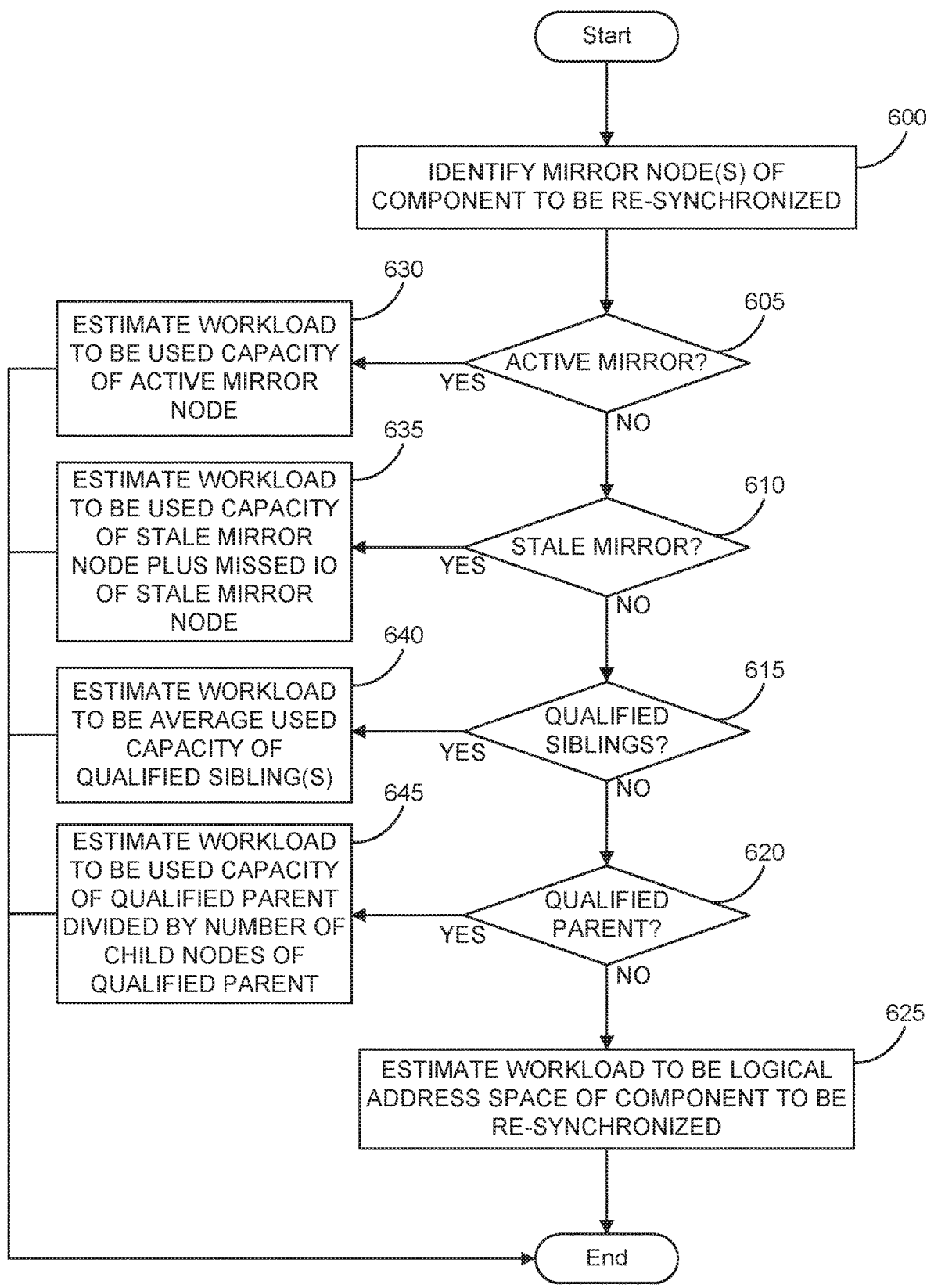
FIG. 6 is a flow diagram depicting example operations for estimating a workload of a re-synchronization operation.

FIG. 6 depicts example operations for estimating a workload of a re-synchronization operation. For example, the operations depicted in FIG. 6 may be performed after a logical component disconnects and then reconnects in a logical storage system in order to determine an estimated workload for re-synchronizing the component before the re-synchronization operation is performed. In some embodiments, the operations depicted in FIG. 6 may be performed by an administrative entity, such as an administrative server or the VSAN module 114 depicted in FIG. 1.

Operations begin at step 600, where any mirror nodes of a component to be re-synchronized are identified. For example, if the component to be re-synchronized is organized according to a mirror (e.g., RAID1) configuration, one or more mirror nodes of the component may be identified.

At step 605, it is determined whether there is an active mirror component for the component to be re-synchronized. If an active mirror node is identified, operations continue at step 630, where the workload for the re-synchronization task is estimated to be the used capacity of the active mirror node. If an active mirror node is not identified, then operations continue at step 610, where it is determined if there is a stale mirror node of the component to be-resynchronized.

At step 610, if a stale mirror node is identified, operations continue at step 635, where the workload for the re-synchronization task is estimated to be the used capacity of the stale mirror node plus an estimate of the missed IO operations of the stale mirror node. The estimate of the missed IO operations of the stale mirror node may be determined by comparing an LSN of the last write operation at the stale mirror node with an LSN of the last write operation of the logical storage system. If a stale mirror component is not identified, operations continue at step 615, where it is determined whether the component to be re-synchronized has qualified sibling nodes.

At step 615, if qualified sibling nodes (e.g., one or more sibling nodes that are active and have full data availability) are identified, then operations continue at step 640, where the workload for the re-synchronization task is estimated to be the average used capacity of the qualified sibling nodes. If no qualified sibling nodes are identified, operations continue at step 620, where it is determined whether the component to be re-synchronized has a qualified parent node.

At step 620, if a qualified parent node (e.g., a parent node that is active and has full data availability) is identified, operations continue at step 645, where the workload for the re-synchronization task is estimated to be the used capacity of the qualified parent node divided by the number of child nodes of the qualified parent node. The used capacity of the qualified parent node may, in some instances, be estimated recursively. If no qualified parent node is identified, operations continue at step 625.

At step 625, other options being unavailable, the workload for the re-synchronization task is estimated to be the logical address space of the component to be re-synchronized. This is generally a worst-case estimate, and is likely to exceed the actual workload of the re-synchronization task, because it is unlikely that the entire address space of the component will be used.

Having estimated the workload of the re-synchronization task, determinations (e.g., automatic determinations, determinations by a user, or the like) may be made based on the estimate. For example, a number of re-synchronization tasks that may be performed at one time may be limited based on the estimate. In other embodiments, the re-synchronization task may be scheduled for an optimal time based on resource availability or based on an amount of the estimated workload (e.g., re-synchronization tasks with smaller estimated workloads may be scheduled first). In other embodiments, a user may be provided with an estimate of how long the re-synchronization task will take based on the estimate (e.g., which may be determined by dividing the estimated workload by an estimated speed of data copy flow), which may assist the user in scheduling and/or planning related to the re-synchronization task. In other embodiments, the estimate may be used to determine whether to perform the re-synchronization task or to choose a different method for restoring the logical component, such as restoring from a backup. In certain embodiments, the estimate may be used to determine whether to reduce the resources allocated to other tasks in order to ensure sufficient resource availability for the re-synchronization task.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for estimating a workload of a re-synchronization task for a data component in a logical storage system, comprising:
    detecting a connection from the data component, wherein the data component was previously disconnected;
    determining a layout of the logical storage system;
    estimating the workload of the re-synchronization task based on whether the layout indicates that the data component has an active mirror component to produce a workload estimate, wherein:
        if the layout indicates that the data component has an active mirror component, the workload estimate is based on the active mirror component, and
        if the layout indicates that the data component does not have an active mirror component, the workload estimate is based on one or more of: the data component; a sibling node of the data component; a parent node of the data component; or a stale mirror component of the data component; and
    performing one or more actions based on the workload estimate, wherein the one or more actions comprise one or more of the following:
        scheduling the re-synchronization task based on the workload estimate;
        determining whether to perform the re-synchronization task or to choose a different process for restoring the data component based on the workload estimate; and
        reducing an amount of resources allocated to another task in the logical storage system based on the workload estimate.

2. The method of claim 1, wherein the workload of the re-synchronization task is estimated based on one of:
    a used capacity of a component indicated in the layout; or
    a logical space of the data component.

3. The method of claim 1, wherein estimating the workload is further based on one of:
    a used capacity of a mirror component of the data component; or
    a used capacity of a sibling node of the data component in the logical storage system.

4. The method of claim 1, wherein estimating the workload of the re-synchronization task based on the layout further comprises:
    if the layout indicates that the data component does not have either an active or stale mirror component:
        determining a used capacity of each of one or more qualified sibling nodes of the data component in the logical storage system, wherein a sibling node is qualified if it is active and has full data availability; and estimating the workload to be an average of the used capacities of the one or more qualified sibling nodes.

5. The method of claim 4, wherein determining the used capacity of each of the one or more qualified sibling nodes of the data component in the logical storage system comprises:

for each qualified sibling node of the one or more qualified sibling nodes that is not a leaf node:
determining a raid node type of the qualified sibling node; and
determining the used capacity of the qualified sibling node based on the raid node type.

6. The method of claim 5, wherein determining the used capacity of the qualified sibling node based on the raid node type comprises:

if the raid node type is RAID1: determining the used capacity of the qualified sibling node to be a capacity of a child node of the qualified sibling node;
if the raid node type is RAID0 or RAID CONCAT: determining the used capacity of the qualified sibling node to be a sum of a used capacity of all child nodes of the qualified sibling node;
if the raid node type is RAID1 over RAID0: determining the used capacity of the qualified sibling node to be a sum of a used capacity of a plurality of available grandchild nodes of the qualified sibling node, wherein the plurality of available grandchild nodes cover an address of the qualified sibling node; and
if the raid node type is erasure coding (EC): determining the used capacity of the qualified sibling node to be an average of a used capacity of all available child nodes of the qualified sibling node multiplied by a number of data nodes of the qualified sibling node.

7. The method of claim 1, wherein estimating the workload of the re-synchronization task based on the layout further comprises:

if the layout indicates that the data component does not have either an active or stale mirror component, that the data component has no qualified sibling nodes, and that the data component has a qualified parent node, wherein a sibling node or a parent node is qualified if it is active and has full data availability:
determining a used capacity of the qualified parent node of the data component in the logical storage system;
determining a number of child nodes of the qualified parent node; and
estimating the workload to be the used capacity of the qualified parent node divided by the number of child nodes.

8. The method of claim 7, wherein estimating the workload of the re-synchronization task based on the layout further comprises:

if the layout indicates that the data component does not have either an active or stale mirror component, that the data component has no qualified sibling nodes, and that the data component does not have a qualified parent node:
determining a logical space of the data component; and
estimating the workload to be the logical space of the data component.

9. The method of claim 1, wherein estimating the workload of the re-synchronization task comprises:

if the layout indicates that the data component has an active mirror component:
determining a used capacity of the active mirror component; and
estimating the workload to be the used capacity of the active mirror component.

10. A non-transitory computer-readable storage medium comprising instructions that, when executed in a computing device, perform a method for estimating a workload of a re-synchronization task for a data component in a logical storage system, the method comprising:

detecting a connection from the data component, wherein the data component was previously disconnected;
determining a layout of the logical storage system;
estimating the workload of the re-synchronization task based on whether the layout indicates that the data component has an active mirror component to produce a workload estimate, wherein:
if the layout indicates that the data component has an active mirror component, the workload estimate is based on the active mirror component; and
if the layout indicates that the data component does not have an active mirror component, the workload estimate is based on one or more of, the data component; a sibling node of the data component; a parent node of the data component; or a stale mirror component of the data component; and
performing one or more actions based on the workload estimate, wherein the one or more actions comprise one or more of the following:
scheduling the re-synchronization task based on the workload estimate;
determining whether to perform the re-synchronization task or to choose a different process for restoring the data component based on the workload estimate; and
reducing an amount of resources allocated to another task in the logical storage system based on the workload estimate.

11. The non-transitory computer-readable storage medium of claim 10, wherein the workload of the re-synchronization task is estimated based on one of:
a used capacity of a component indicated in the layout; or
a logical space of the data component.

12. The non-transitory computer-readable storage medium of claim 10, wherein estimating the workload is further based on one of:
a used capacity of a mirror component of the data component; or
a used capacity of a sibling node of the data component in the logical storage system.

13. The non-transitory computer-readable storage medium of claim 10, wherein estimating the workload of the re-synchronization task based on the layout further comprises:

if the layout indicates that the data component does not have either an active or stale mirror component:
determining a used capacity of each of one or more qualified sibling nodes of the data component in the logical storage system, wherein a sibling node is qualified if it is active and has full data availability; and
estimating the workload to be an average of the used capacities of the one or more qualified sibling nodes.

14. The non-transitory computer-readable storage medium of claim 13, wherein determining the used capacity of each of the one or more qualified sibling nodes of the data component in the logical storage system comprises:

for each qualified sibling node of the one or more qualified sibling nodes that is not a leaf node:
determining a raid node type of the qualified sibling node; and
determining the used capacity of the qualified sibling node based on the raid node type.

15. The non-transitory computer-readable storage medium of claim 14, wherein determining the used capacity of the qualified sibling node based on the raid node type comprises:
if the raid node type is RAID1: determining the used capacity of the qualified sibling node to be a capacity of a child node of the qualified sibling node;
if the raid node type is RAID0 or RAID CONCAT: determining the used capacity of the qualified sibling node to be a sum of a used capacity of all child nodes of the qualified sibling node;
if the raid node type is RAID1 over RAID0: determining the used capacity of the qualified sibling node to be a sum of a used capacity of a plurality of available grandchild nodes of the qualified sibling node, wherein the plurality of available grandchild nodes cover an address of the qualified sibling node; and
if the raid node type is erasure coding (EC): determining the used capacity of the qualified sibling node to be an average of a used capacity of all available child nodes of the qualified sibling node multiplied by a number of data nodes of the qualified sibling node.

16. The non-transitory computer-readable storage medium of claim 10, wherein estimating the workload of the re-synchronization task based on the layout further comprises:
if the layout indicates that the data component does not have either an active or stale mirror component, that the data component has no qualified sibling nodes, and that the data component has a qualified parent node, wherein a sibling node or a parent node is qualified if it is active and has full data availability:
determining a used capacity of the qualified parent node of the data component in the logical storage system;
determining a number of child nodes of the qualified parent node; and
estimating the workload to be the used capacity of the qualified parent node divided by the number of child nodes.

17. The non-transitory computer-readable storage medium of claim 16, wherein estimating the workload of the re-synchronization task based on the layout further comprises:
if the layout indicates that the data component does not have either an active or stale mirror component, that the data component has no qualified sibling nodes, and that the data component does not have a qualified parent node:
determining a logical space of the data component; and
estimating the workload to be the logical space of the data component.

18. The non-transitory computer-readable storage medium of claim 10, wherein estimating the workload of the re-synchronization task comprises:
if the layout indicates that the data component has an active mirror component:
determining a used capacity of the active mirror component; and
estimating the workload to be the used capacity of the active mirror component.

19. A computer system, comprising:
a storage device comprising a file system;
a processor (CPU) configured to perform a method for estimating a workload of a re-synchronization task for a data component in a logical storage system, the method comprising:
detecting a connection from the data component, wherein the data component was previously disconnected;
determining a layout of the logical storage system;
estimating the workload of the re-synchronization task based on whether the layout indicates that the data component has an active mirror component to produce a workload estimate, wherein:
if the layout indicates that the data component has an active mirror component, the workload estimate is based on the active mirror component; and
if the layout indicates that the data component does not have an active mirror component, the workload estimate is based on one or more of: the data component; a sibling node of the data component; a parent node of the data component; or a stale mirror component of the data component; and
performing one or more actions based on the workload estimate, wherein the one or more actions comprise one or more of the following:
scheduling the re-synchronization task based on the workload estimate;
determining whether to perform the re-synchronization task or to choose a different process for restoring the data component based on the workload estimate; and
reducing an amount of resources allocated to another task in the logical storage system based on the workload estimate.

20. The computer system of claim 19, wherein the workload of the re-synchronization task is estimated based on one of:
a used capacity of a component indicated in the layout; or
a logical space of the data component.

* * * * *